Aug. 1, 1961  C. W. TITTLE  2,994,777
NEUTRON GENERATOR
Filed July 19, 1957

INVENTOR
CHARLES W. TITTLE

BY *Joseph Weingarten*
ATTORNEY

United States Patent Office 2,994,777
Patented Aug. 1, 1961

2,994,777
NEUTRON GENERATOR
Charles W. Tittle, Newtonville, Mass., assignor to Tracerlab, Inc., Waltham, Mass., a corporation of Massachusetts
Filed July 19, 1957, Ser. No. 673,044
8 Claims. (Cl. 250—84.5)

The present invention relates in general to apparatus for producing neutrons and more particularly to an efficient, relatively low cost neutron generator adapted to operate in confined spaces, as for example, within a cartridge capable of passing through the relatively small diameter bores encountered in oil wells.

Neutron generators of various designs are extremely well know in the art. However, severe limitations on the physical nature of the equipment are imposed when neutron generators are used in investigations of the geological composition of the earth's substrata. It is apparent that in logging oil well strata it is necessary that the generating and detection equipment be housed within a package of relatively small dimensions adapted to withstand extremes of pressure, temperature and mechanical shock. An oil well might have an inner casing diameter of five and one-half inches and extend to a depth of the order of twenty thousand feet. This would then limit the maximum diameter of the cartridge containing the neutron generator to approximately four inches. Temperatures might well reach the maximum of over 300° C. and the pressures on the tool at the bottom of the well may run as high as ten thousand pounds per square inch or more. Furthermore, since the device is often lowered to the bottom of the well at speeds as high as ten feet per second, collisions between the tool and irregularities in the well casing produce severe mechanical shocks which must be absorbed to avoid costly shutdowns and reruns.

Neutron generators capable of performing under conditions encountered in oil well surveys have been proposed. However, since the neutron flux output is closely dependent on the high voltage applied to the generator electrode, in practice, neutron flux intensity has been limited due to the problems of developing and transmitting a sufficiently high voltage within the limited space available.

The present invention contemplates and has as a primary object the provision of a simplified, relatively inexpensive, highly efficient neutron generator wherein several of the critical functions have been combined to minimize electronic components and high voltage problems while obtaining maximum neutron flux generating capacity in a predetermined small volume.

It is another object of this invention to provide a neutron generator wherein the neutron generating tube also functions as an electron tube rectifier to furnish the high voltage required for the generation of a satisfactory neutron flux.

It is still another object of this invention to provide a neutron generator wherein the neutron generating tube serves as an electron tube rectifier on alternate half cycles of the A.C. power source. As a rectifier, this tube serves to charge a capacitor whose voltage is then combined with the opposite polarity half cycle from the alternating source to yield still higher voltages and more intense neutron fluxes.

These and other objects of the present invention will now become apparent from the following detailed description of a preferred embodiment of the invention wherein.

Figure 1:
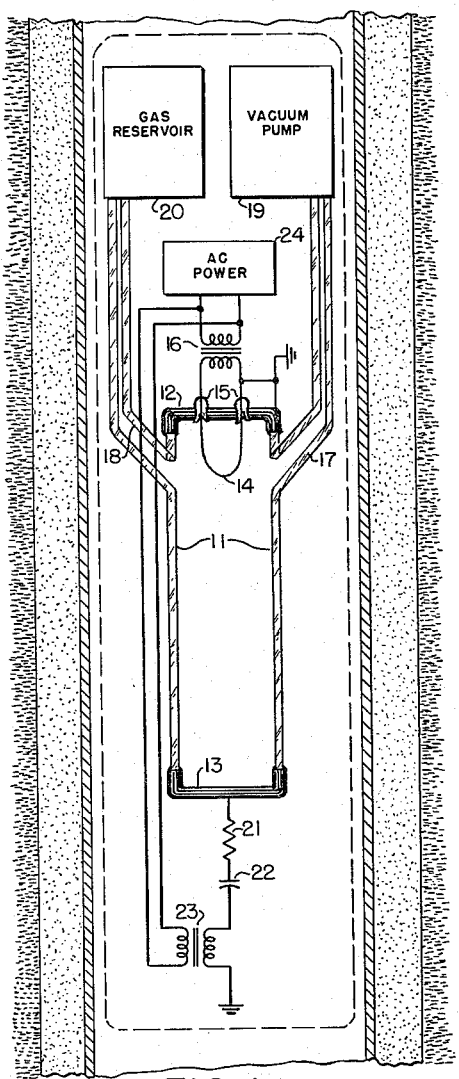
FIG. 1 is an illustration partly in schematic form of the neutron generator.

With reference now to the drawing and more particularly to FIG. 1 thereof, the neutron generator of this invention is diagrammatically shown enclosed by a broken line representing the general configuration of a well survey tool within a typical oil well bore. The purpose of such illustration is to generally indicate the problem encountered in devising a neutron generator which includes gas accessories and power source within an axial container no more than four inches in inside diameter. While FIG. 1 discloses axial alignment of the various components within the limited space available, it is not intended that this view be an accurate scale drawing of either the tool or casing.

More specifically, with reference to FIG. 1, the discharge tube is seen to comprise a generally cylindrical glass envelope 11 capped at both ends by conductive metal electrode cups 12 and 13, hermetically sealed to the glass in the conventional manner. Upper electrode 12 is fitted with a pair of hermetically sealed feed-through insulators 15 which in turn support a filament 14 of tungsten or other suitable thermionic electron emissive material in the upper end of the discharge tube closely adjacent electrode 12.

The opposed ends of filament 14 are joined to the secondary winding of filament transformer 16, the primary of which is connected to a suitable A.C. power supply 24. Although not illustrated, the power source 24 is energized preferably over a cable which extends from the tool casing to the surface of the earth.

As shown, one side of filament 14 and electrode 12 are grounded. Electrode 12 may, if desired, be negatively biased with respect to the tungsten filament 14.

A pair of tubes 17 and 18 open into the interior of envelope 11 and furnish the means for connecting a vacuum pump 19 and a gas reservoir 20, respectively.

Electrodes 12 and 13 are preferably formed of Kovar which is particularly satisfactory since it is able to withstand the imposed extremes of temperature while being readily sealable to the glass envelope 11. A suitable target material (not shown) is deposited and adhered to the inner surface of electrode 13. The specific composition of this target and the function performed thereby will be described in considerable detail below.

Electrode 13 is returned to ground through the serial combination of current limiting resistor 21, capacitor 22, and the secondary winding of a high voltage transformer 23. As indicated, the primary of this transformer is also energized from A.C. power source 24.

Figure 2:
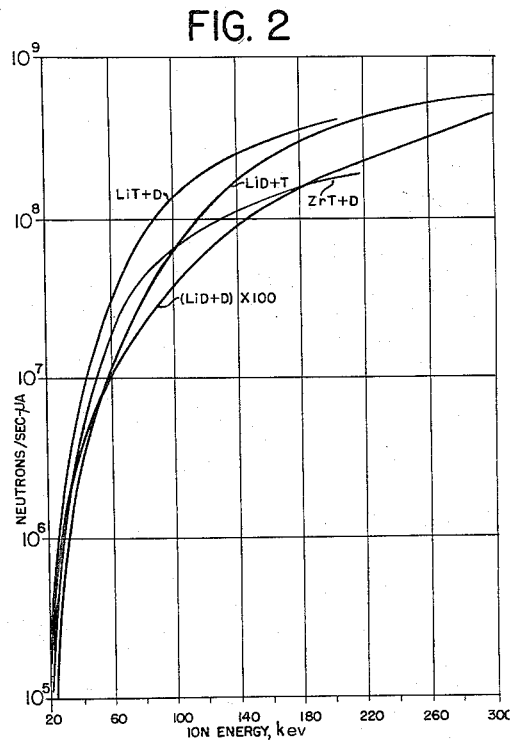
FIG. 2 is a graphical representation of the neutron output as a function of input energy for a multiplicity of neutron producing chemical reactions.

Having described the nature and interconnection of the key elements of the neutron generator, the mode of operation will now be discussed. The discharge tube is maintained at a dynamic pressure equilibrium by means of controlled gas flow from reservoir 20, combined with gas evacuation by means of pump 19. This internal gas pressure is such that upon the application of a suitably large potential, negative at electrode 13 with respect to electrode 12, a gas discharge is initiated. During this discharge, positive ions are formed in the gas, which ions are electrostatistically accelerated to bombard the target coating on the inner surface of electrode 13. If the gas furnished by reservoir 20 is a heavy isotope of hydrogen, for example, deuterium or tritium, or a mixture thereof, and the target electrode 13 is formed with a suitable isotope containing coating, such as lithium deuteride, lithium tritide, or tritiated zirconium, neutrons are produced as a result of the $D(d,n)$, $D(t,n)$, and/or $T(d,n)$ reactions. The number of neutrons produced is dependent upon both the amount and energy of positive ions striking the target electrode. FIG. 2 indicates the computed values of neutron output per unit current as a function of positive ion energy for several different reactions. As is evident from this set of curves, the neutron flux is strongly dependent upon the ion energy, hence increasing the discharge producing voltage greatly increases the efficiency of the neutron generator.

Figure 3:
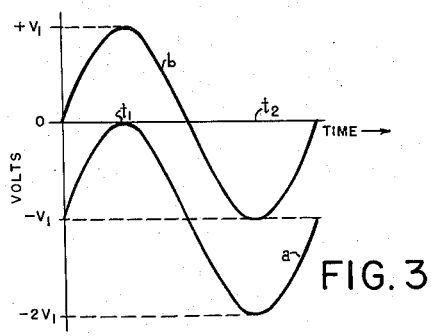

The interconnection of components as shown in FIG. 1 provide, in accordance with the present invention, an exceedingly high potential through the rectifier-voltage doubler action of the discharge tube on alternate half cycles. Thus, considering only thermionic filament 14 and electrode 13, the discharge tube may be thought of as an electron tube rectifier. The waveform of the voltage appearing across these two electrodes is graphically illustrated by curve (a) of FIG. 3, while curve (b) of the same figure represents the waveform of voltage appearing across the secondary winding of high voltage transformer 23.

As the potential of the ungrounded side of the secondary of transformer 23 becomes positive, electrons emitted from filament 14 are drawn to the positive target electrode, and in effect the tube introduces only a low impedance in series with capacitor 22. This current flow charges capacitor 22 to voltage $V_1$ at time $t_1$. As the voltage then begins to decrease, electrons are no longer drawn to the target electrode 13 and the impedance of the tube becomes exceedingly high, thus enabling the negative potential on the alternate half cycle of current from power source 24 to add to the potential $V_1$ appearing across capacitor 22, and at time $t_2$ the potential across electrodes 12 and 13 is $2V_1$.

It should be observed at this point that if the envelope 11 is filled with gas from reservoir 20 at a relatively low pressure, as normally used for neutron generation, this gas will not appreciably affect electron flow and the rectifier action which charges capacitor 22 on the positive half cycle. On the other hand, during the negative half cycle when the combined potentials of capacitor 22 and the secondary of transformer 23 exceed a critical potential as determined by the gas pressure, a high voltage neutron-producing discharge is generated within the envelope 11.

Figure 4:
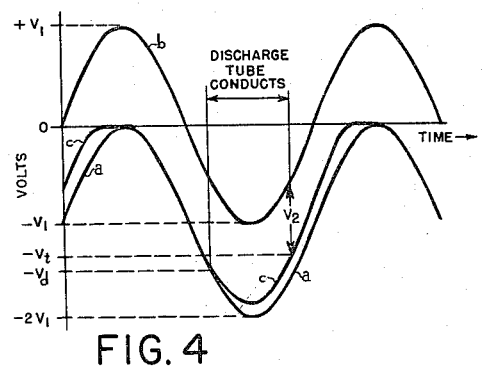
FIGS. 3 and 4 are graphical representations of voltage waveforms helpful to an understanding of the operation of the system to be described.

Turning now to FIG. 4, curve (c) graphically illustrates the waveform of voltage appearing across electrodes 12 and 13 under operating conditions. As in FIG. 3, curve (a) represents the voltage waveform across the electrodes in the absence of a discharge, and curve (b) is again the voltage waveform output of the high voltage transformer 23. If $-V_d$ is the potential at which the discharge occurs and $-V_t$ is the potential at which the discharge terminates, the power obtained is given by the expression:

$$P = \tfrac{1}{2} fC[V_d^2 - (V_t - V_2)^2] + \frac{\int_0^T iV_1 \sin \frac{2\pi t}{T} dt}{T}$$

where:

$f$ is the frequency of the alternating current supply in cycles per second,
C is the capacitance of capacitor 22 in farads,
$V_1, V_d, V_t, V_2$ are potentials as in FIG. 4, in volts,
T is the duration of one cycle in seconds,
$t$ is time in seconds, and
$i$ is the current in amperes.

In the above expression the first term is the power delivered by capacitor 22 and the second is the power delivered by the transformer 23 while the generator tube is conducting. If the potential drop $(V_t - V_2)$ is small compared to the potential $V_d$, and if the current can be approximated by a rectified sine wave of maximum value $I_1$, then it can be shown that the expression for the power becomes:

$$P = 2V_1 I_1 \left(\frac{1}{\pi} + \frac{1}{2}\right)$$

The neutron-producing capability of such a generator is materially enhanced as the available potential is increased, since as is evident from FIG. 4, a high potential $V_1$ will effectively lengthen the duration of that portion of the cycle marked "Discharge Tube Conducts." In the narrow radial construction of a downhole neutron generator the potential is limited by both the transformer size limitation and high voltage insulation problems. The use of a rectifier doubles the voltage available from the transformer and since in accordance with this invention the discharge tube itself serves as the electron tube rectifier, it is unnecessary to have the high voltage lead extending from resistor 21 to electrode 13 physically parallel to either the rectifier tube or the high voltage capacitor. Effectively then, the configuration shown in FIG. 1 approximately doubles the space available for insulation permitting higher voltages to be applied, with the result apparent from FIG. 2, of substantially increasing the generated neutron flux.

While the present invention has been described and illustrated in FIG. 1 for use in oil well survey equipment, it should be quite apparent that its utility is not necessarily so limited. In other words, the cost and space saving achieved in component parts is equally advantageous for portable or laboratory neutron generating equipment.

In view of the fact, therefore, that numerous modifications and departures may now be made by those skilled in this art, the invention herein is to be construed as limited only by the spirit and scope of the appended claims.

What is claimed is:

1. Apparatus for generating neutrons comprising in circuit a discharge tube, an alternating current power source and energy storage means, means coupling said discharge tube into said circuit as an electron tube rectifier for charging said energy storage means on half cycles of energy of one polarity from said source, and means coupling said discharge tube into said circuit as a neutron producing discharge tube energized through said storage means during alternate half cycles of energy from said source.

2. Apparatus for producing neutrons comprising a discharge tube, an alternating current power source and energy storage means, means coupling said tube, source and storage means on half cycles of one polarity of energy from said source for charging said storage means from said source through said tube, and means operative on alternate half cycles for additively combining the potential of said source and said charged storage means and applying said combined potential to said tube for effecting a neutron generating high voltage discharge.

3. Apparatus for generating neutrons comprising a discharge tube having first and second opposed electrodes in an ionizable gaseous medium, an alternating current power source, a high voltage transformer having a primary winding energized from said power source and a secondary winding, a capacitor coupling said secondary winding to said first electrode, said second electrode including an electron source, said high voltage transformer secondary winding and said electron source being arranged whereby on one half cycle of energy from said power source said discharge tube serves as an electron tube rectifier for charging said capacitor and whereby on the opposite half cycle of energy from said source the potentials of said secondary winding and said charged capacitor are additively combined to achieve a high voltage ionizing discharge between said electrodes, said first electrode being formed as a target capable of generating neutrons under ion bombardment during said discharge.

4. Apparatus for generating neutrons comprising a discharge tube having first and second opposed electrodes in an ionizable gaseous medium, an alternating current power source, a high voltage transformer having a primary winding energized from said power source and a secondary winding, a capacitor coupling said secondary winding to said first electrode, said second electrode including a thermionic electron emissive filament, means for heating said filament from said power source, said high voltage transformer secondary winding and said electron emissive filament being arranged whereby on one half cycle of energy from said power source said discharge tube serves as an electron tube rectifier for charging said capacitor and whereby on the opposite half cycle of energy from said source the potentials of said secondary winding and said charged capacitor are additively combined to achieve a high voltage ionizing discharge between said electrodes, said first electrode being formed as a target capable of generating neutrons under ion bombardment during said discharge.

5. Neutron generating apparatus in accordance with claim 4 wherein said thermionic emissive filament is insulated from and closely adjacent to said second electrode.

6. Apparatus for generating neutrons comprising a discharge tube having an envelope and first and second axially spaced end electrodes, means for maintaining an ionizable hydrogen isotope within said envelope between said electrodes, a high voltage transformer disposed axially of said tube and adjacent said first electrode, an alternating current power source, means coupling the primary winding of said high voltage transformer to said power source, a storage capacitor adjacent said first electrode, said capacitor coupling the secondary winding of said high voltage transformer to said first electrode, a thermionic electron emissive source within said discharge tube adjacent said second electrode, means for heating said filament from said power source, said high voltage transformer secondary winding and said electron emissive filament being arranged whereby on one half cycle of energy from said power source said discharge tube serves as an electron tube rectifier for charging said capacitor and whereby on the opposite half cycle of energy from said source the potentials of said secondary winding and said charged capacitor are additively combined to achieve a high voltage ionizing discharge between said electrodes, said first electrode being formed as a target capable of generating neutrons under ion bombardment during said discharge.

7. Neutron generating apparatus in accordance with claim 6 and including a second transformer disposed axially of said tube adjacent said second electrode, said second transformer being energized from said power source and coupled to said thermionic electron emissive source.

8. Apparatus for generating neutrons comprising a discharge tube having first and second opposed electrodes in an ionizable gaseous medium, an alternating current power source, energy storage means coupling said power source to said first electrode, said second electrode including an electron source, said power source and said electron source being arranged whereby on one alternating current half cycle said discharge tube serves as an electron tube rectifier for charging said energy storage means and whereby on the opposite alternating current half cycle the potentials of said alternating current source and said charged energy storage means are additively combined to achieve a high voltage ionizing discharge between said electrodes, said first electrode being formed as a target capable of generating neutrons under ion bombardment during said discharge.

References Cited in the file of this patent
UNITED STATES PATENTS

| | | |
|---|---|---|
| 2,240,914 | Schutze | May 6, 1941 |
| 2,689,918 | Youmans | Sept. 21, 1954 |
| 2,769,096 | Frey | Oct. 30, 1956 |